Feb. 19, 1963  R. E. ROOD  3,077,776
THERMAL INDICATOR FOR ELECTRICAL APPARATUS
Filed Feb. 13, 1959  4 Sheets-Sheet 1

WITNESSES
Edwin E. Bassler
Clement L. McHale

INVENTOR
Robert E. Rood
BY F. E. Browder
ATTORNEY

Feb. 19, 1963    R. E. ROOD    3,077,776
THERMAL INDICATOR FOR ELECTRICAL APPARATUS
Filed Feb. 13, 1959    4 Sheets-Sheet 3

Feb. 19, 1963  R. E. ROOD  3,077,776
THERMAL INDICATOR FOR ELECTRICAL APPARATUS
Filed Feb. 13, 1959  4 Sheets-Sheet 4

United States Patent Office 3,077,776
Patented Feb. 19, 1963

3,077,776
THERMAL INDICATOR FOR ELECTRICAL APPARATUS
Robert E. Rood, Sharon, Pa., assignor to Westinghouse Electric Corporation, East Pittsburgh, Pa., a corporation of Pennsylvania
Filed Feb. 13, 1959, Ser. No. 793,026
17 Claims. (Cl. 73—350)

This invention relates to thermal indicators for electrical apparatus such as transformers.

In certain types of conventional electrical apparatus, such as transformers, it has been the common practice in building such apparatus to bury thermostats, thermocouples and other thermally responsive devices in the windings or coils of such apparatus, the temperature or thermal load condition of which it is desired to measure or indicate. If such thermal indicating equipment should require repair, it may be necessary to tear down the windings or other parts of such apparatus. The latter procedure may also be necessary to add thermal indicating equipment to existing electrical apparatus.

In copending application Serial No. 793,027, filed February 13, 1959, by Herbert W. Book and assigned to the same assignee as the present application, there is disclosed an improved thermal or temperature indicator which does not require thermally responsive parts or devices to be built into the windings or coils of the associated electrical apparatus and which is particularly adapted for installation external to, or on the outside of the casing or housing of electrical apparatus of the enclosed type. While the thermal indicator disclosed in said copending application is suitable for most applications, there are certain applications where it is required to provide an indicator which shows that the associated electrical apparatus is being or has been subjected to a thermal load in excess of a predetermined value. It is, therefore, desirable to provide a thermal or temperature indicator for electrical apparatus which has all of the advantages of the indicator disclosed in said copending application and which has several additional advantages in certain applications.

It is an object of this invention to provide for indicating the thermal load condition of an electrical apparatus.

It is also an object of this invention to provide for indicating the temperature of an electrical apparatus.

Another object of this invention is to provide for measuring and indicating the temperature or thermal load condition of an electrical winding or coil which is so disposed in a casing or relative to other apparatus that it is not readily accessible.

A further object of this invention is to provide means for indicating the thermal load condition of electrical apparatus which responds to a magnetic field resulting from the flow of electrical current which causes the heating of said apparatus.

A still further object of the invention is to provide a thermal indicator for electrical apparatus of the enclosed type which is particularly adapted for installation external to or on the outside of the casing of such apparatus.

A more specific object of the invention is to provide for indicating when the thermal load condition of an enclosed electrical apparatus exceeds a predetermined value.

Other objects of the invention will in part be obvious and will in part appear hereinafter.

For a fuller understanding of the nature and objects of the invention, reference should be had to the following detailed description taken in connection with the accompanying drawings, in which.

Figures 7, 9:
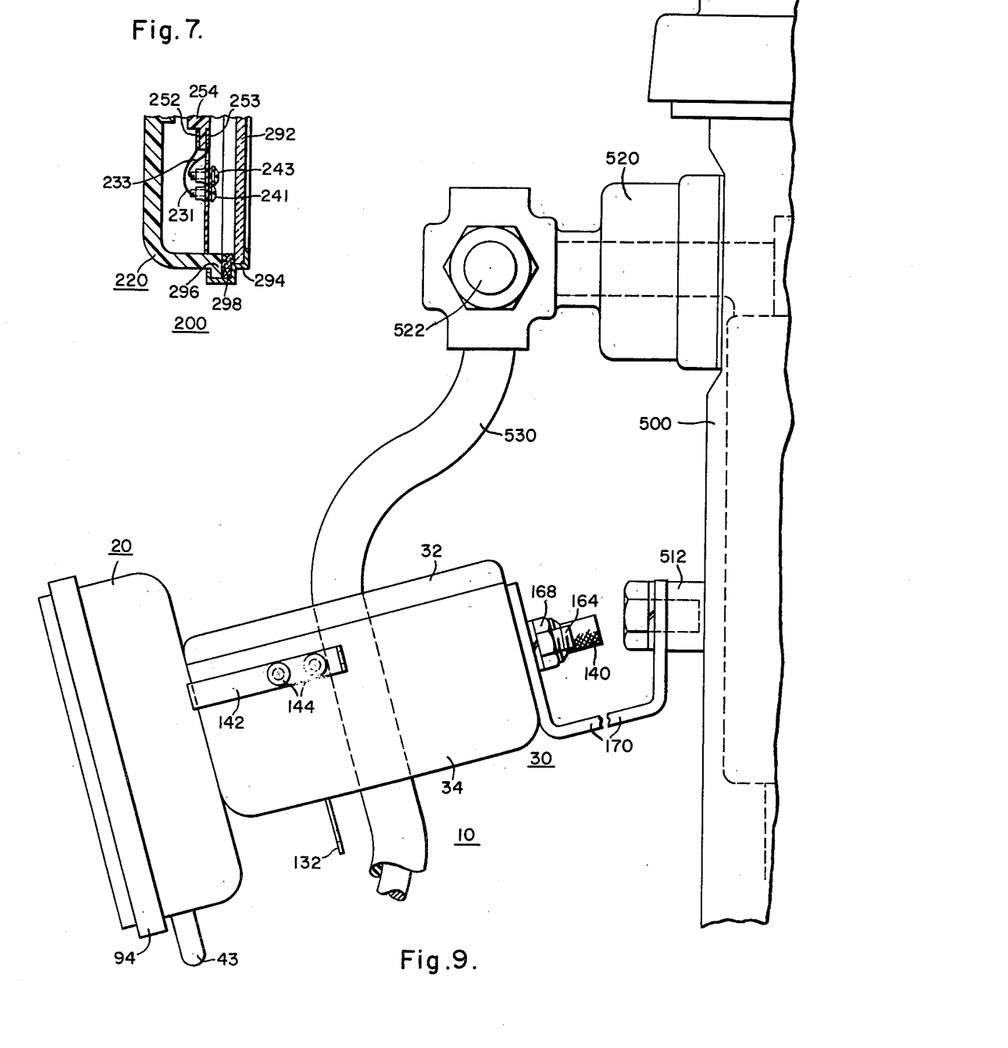
FIG. 7 is a partial side elevational view, in section of the indicator shown in FIG. 5.
FIG. 9 is a partial view in elevation illustrating the manner in which the indicators shown in FIGS. 1 through 4 or in FIGS. 5 through 7, respectively, would be mounted on the associated electrical apparatus.

Referring now to the drawings and FIGS. 1 through 4 and 9 in particular, there is shown in general a temperature or thermal load indicator 10 illustrating a first embodiment of the invention. The indicator for electrical apparatus shown generally at 10 is a modification suitable for application to a distribution transformer. The casing or housing of the associated electrical apparatus, such as a transformer, is indicated at 500 in FIG. 9. The electrical apparatus enclosed or disposed inside the casing 500 may be a transformer core and coil assembly (not shown) to and from which electrical current is carried from outside of the casing 500 by associated leads which may include one or more conductors, such as the conductor 530, having a covering of insulation thereon, as shown in FIG. 9. The conductor 530 may be connected to a suitable terminal connector 522 and the electrical current carried by the conductor 530 may pass through the casing or housing 500 through a suitable bushing 520 as shown in FIG. 9.

The flow of electrical current to the associated electrical apparatus through one or more of the conductor leads 530 causes the temperature or thermal load condition of the electrical windings or coils of the associated apparatus inside the casing 500 to change, the extent of such changes being measured and indicated by the thermal indicator 10. The thermal indicator 10, as illustrated, is particularly adapted to indicate when the temperature or thermal load of the associated electrical apparatus exceeds a predetermined value. Since the thermal indicator 10 is disposed adjacent to the leads of the assocated electrical apparatus, it is preferable that, if the indicator 10 is employed with a transformer core and coil assembly, the indicator 10 should be disposed adjacent to the secondary or low voltage leads associated with said assembly in order to reduce the insulation requirements in the construction of said indicator.

Figure 1:
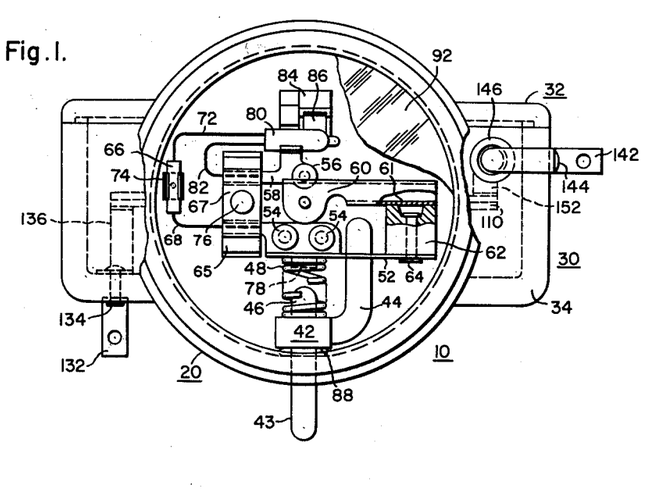
FIGURE 1 is a front view, in elevation, of a thermal indicator illustrating a first embodiment of the invention.
Figures 4, 8:
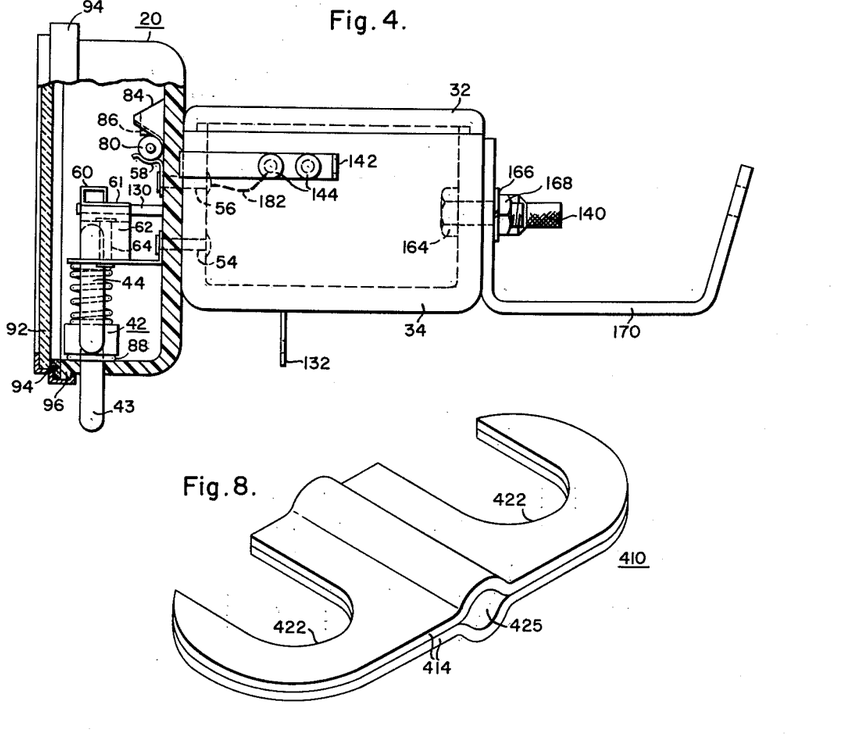
FIG. 4 is a side elevational view, partially in section, of the indicator shown in FIG. 1.
FIG. 8 is a perspective view illustrating an alternative form of the magnetic member included in the indicators shown in FIGS. 2 and 6.

As best shown in FIG. 9, the thermal indicator 10 is mounted or secured on the outside of the casing 500 of the associated electrical apparatus by any suitable means, such as the stud member 512 which is welded or otherwise secured to the casing 500 and a bracket member 170, which in turn is secured to said stud member and the thermal indicator 10. Referring particularly to FIGS. 1, 4 and 9, the thermal indicator 10 comprises an indicating case or housing 20 and a base member 30 which may be both molded or cast from a suitable material, such as a silicone rubber or elastomer, that will have adequate strength and capacity to resist the weather when mounted outdoors. Since the indicator 10 may be associated with a transformer which is mounted on poles or in some location well above the ground level, the indicating case 20, the base member 30 and the bracket member 170 may be arranged so that the indicating case 20 of the indicator 10 will be inclined at an angle to the horizontal to facilitate observation from the ground.

Figure 2:
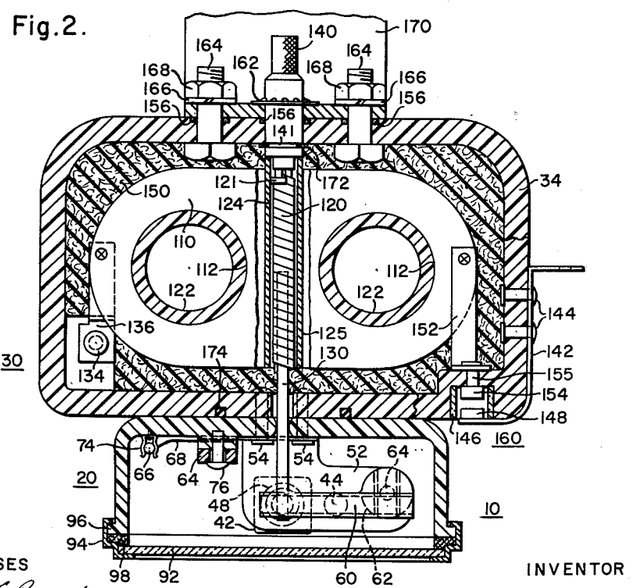
FIG. 2 is a top plan view, in section, of the indicator shown in FIG. 1.
Figure 3:
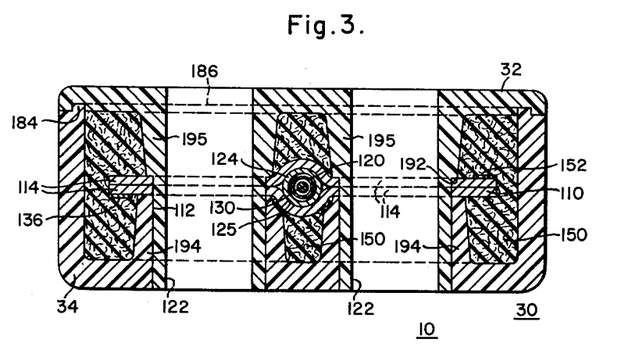
FIG. 3 is a partial front sectional view, in elevation, of the indicator shown in FIG. 1.

The thermal indicator 10 also includes means for sensing the temperature of the associated electrical apparatus inside the casing 500. The sensing means comprises a magnetic member 110 which is mounted or disposed inside the base member or housing 30 as shown in FIGS. 1, 2 and 3. Both the base member 30 and the magnetic member 110 include two openings or apertures 122 and 112, respectively, which permit one or more leads, such as the conductor lead 530 shown in FIG. 9, to pass through said base member and said magnetic member. As best shown in FIG. 3, the magnetic member 110 may be conveniently formed from two plates or sheets 114, each of said plates including a curved portion between the apertures 112 to form a cavity or receptacle as indicated at 125. As explained in copending application Serial No. 649,116, filed by Herbert W. Book and assigned to the same assignee as the present application for a magnetic member of the same general type, the magnetic member 110 is preferably formed from a metallic magnetic material and may be molded from powdered metals or cast in one piece from metallic material or formed in other suitable ways that are well known in the art and that will provide the features to be described hereinafter. The size, shape and thickness of the magnetic member 110 will depend to a large extent on the apparatus with which it is to be employed. The selection of the magnetic material from which the magnetic member 110 is formed may also depend on the thermal insulation to be employed with said member and may be formed from any of the well-known magnetic metals, alloys or metallic oxides which are available.

As explained in the copending application just mentioned, whenever electrical current flows through the conductor leads 530 to an associated electrical apparatus inside the casting 500, a magnetic field will be set up adjacent to or around the conductor leads 530 shown in FIG. 9. The density of the magnetic field set up around the conductor leads 530 will vary with the magnitude or amount of the current flowing in said leads. When a metallic magnetic member, such as the member 110, is disposed in a magnetic field around one or more of the conductor leads 530, many of the lines of magnetic flux in the space around said member will be concentrated in it to thereby heat up said member. The member 110 thus accumulates heat which varies with the density of the magnetic flux around one or more of the conductor leads 530, which in turn varies with the electrical current flowing in said leads and in the associated electrical apparatus inside the casing 500. Since the temperature or thermal load condition of the electrical apparatus, which may include electrical windings or coils inside the casing 500, also varies with the current flowing in the leads 530, the temperature or thermal condition of the magnetic member 110 will vary as a function of the temperature or thermal condition of the apparatus inside the casing 500. In other words, the magnetic member 110 may be suitably designed to provide a thermal "image" of the electrical apparatus which is disposed inside the casing 500.

The base member 30 comprises a cover member 32 and a lower portion 34. The cover member 32 includes a groove or narrow recess which extends around the periphery on the underside of said cover member. The lower portion 34 of the base member 30 includes a projecting portion 184 which substantially fills the groove 186 of the cover member 32 when said cover member and said lower portion are assembled. The groove 186 may be at least partially filled or coated with a suitable thermosetting resin, such as an epoxy resin, prior to the assembly of the cover member 32 with the lower portion 34 in order to secure said cover member to said lower portion and to seal the joint between said parts of the base member 30. The cover member 32 is also provided with two cylindrical projecting members 195 which may be formed integrally with the cover member 32 to form the apertures 122 through which one or more of the leads 530 may pass. The lower portion 34 of the base member 30 is also provided with two cylindrical projecting members 194 which fit over the outside of the cylindrical members 195 of the cover member 32 when the cover member 32 and said lower portion are assembled as shown in FIG. 3. As shown in FIG. 3, the magnetic member 110 may be supported between the cylindrical members 194 of the lower portion 34 of the base member 30 and the shoulder or ledge portions 192 on the cylindrical members 195 of the cover member 32.

In order to control the heat transfer from the magnetic member 110, the base member 30 is preferably formed from a thermally insulating material which may also be an electrically insulating material to assist in insulating the magnetic member 110 from the conductor leads 530. The thermal insulation 150 may also be disposed around at least a portion of the magnetic member 110 to assist in the control of heat transfer from said member. The thermal insulation 150 may be provided in the form of polyester glass, wool or matting or as a cast member which assists in supporting the magnetic member 110. It is to be understood that in certain applications, a portion of the base member 30 may be formed from thermally conducting material to more closely create a thermal image or reflection having similar thermal characteristics to the electrical apparatus inside the casing or housing 500. In other words, by proper selection and design of the base member 30 and the thermal insulation 150 as well as the magnetic member 110, the temperature or thermal condition of the magnetic member 110 may more closely correspond to the thermal operating characteristics of the associated electrical apparatus.

In order to supply electric power to indicating means included in the thermal indicator 10, which will be described hereinafter, a first terminal or external ground strap 132 is secured to the base member 30 by suitable means such as the rivet 134, which is best shown in FIG. 1. A suitable conductor or internal ground strap 136 having one end connected to the rivet 134 and having the other end secured to the magnetic member 110 by suitable means, such as brazing or welding, connects the first terminal 132 to the magnetic member 110. A second terminal or line terminal 142 is secured to the base member 30 by the rivets 144, as shown in FIGS. 1, 2 and 4. In order to limit the voltage applied to the associated indicating means when a source of electric power is connected between the terminals 132 and 142, a suitable arc shield or gap protector 160 is disposed adjacent to the second terminal 142. The gap protector 160 comprises a cylindrical member formed from a suitable insulating material, such as porcelain, a first electrode secured to the terminal 142 and a second electrode 154. The second electrode 154 of the protector 160 is secured to the base member 30 by the rivet 155 which in turn is connected to the magnetic member 110 by the conductor strap 152, which is secured to the magnetic member 110 by suitable means, such as brazing or welding. It is to be noted that the base member 30 is secured to the bracket member 170, as best shown in FIG. 2, by any suitable means such as the bolts 164 and the associated nuts 168 and the lock washers 166. In order to provide a seal where the bolts 164 pass through the openings in the base member 30, the gaskets or O-ring packing members 156 may be provided around said bolts.

In order to sense the temperature or thermal condition of the magnetic member 110, which is a function of the temperature of the associated electrical apparatus as previously mentioned, a thermally responsive device or means, more specifically a helical bimetallic element 120, which may be of any conventional type, is disposed in the receptacle 125. In order to improve the response of the bimetal 120 to the temperature or thermal condition of the magnetic member 110, the axes of the receptacle 125 and the bimetallic element 120 lie in substantially the same plane as the magnetic member 110 and said bimetal is preferably surrounded by said magnetic member. In order to provide a smooth surface for the receptacle 125 in which the bimetal 120 may rotate as it deforms in response to or is actuated by the temperature of the magnetic member 110, a sleeve or tube member 124 is disposed inside the receptacle 125 as best shown in FIGS. 2 and 3. The tube member 124 is preferably formed from a material having a high degree of thermal conductivity and preferably one of a non-corrosive type, such as copper or brass. In order to adjust the response of the bimetallic element 120 to the temperature or thermal condition of the magnetic member 110 or to compensate for different environmental ambient temperatures, a bimetal adjusting knob 140 is secured to one end of the bimetallic element 120 by any suitable means, such as bonding with an epoxy resin. In order to prevent axial movement of the bimetal adjusting knob 140 while still permitting said knob to be rotated, said knob is provided with a circular groove or recess 141 in which is disposed a retaining ring 172 at the point where said knob passes into the inside of the base member 30. A spring type lock washer 162 is disposed around the adjusting knob 140 to assist in preventing axial movement of said knob and is disposed where said knob passes through the bracket member 170. In order to provide a seal where the adjusting knob 140 passes through the base member 30, a suitable gasket or O-ring packing member 156 is provided or disposed around said knob at the point where the adjusting knob 140 leaves the outside of the base member 30. In order to complete an electrical circuit which will be described hereinafter, a leaf spring type contact may be electrically connected to the helical bimetallic element 120 at the point where said bimetal is secured to the adjusting knob 140 and arranged to rotate with said knob in contact with the inside surface of the tube member 124. The latter arrangement is based on providing an adjusting knob 140 formed from electrically insulating material. Alternatively, the adjusting knob 140 may be formed from an electrically conducting material in electrical contact with the bimetallic element 120 and the leaf spring contact 121 omitted.

In order to indicate the temperature or thermal condition of the magnetic member 110, a rotatable shaft 130 is secured or attached to the helical bimetal 120 by suitable means, such as soldering or brazing. As the electrical current which flows in the lead conductors 530 changes, the magnetic flux around said leads changes and the temperature of the magnetic member 110 changes. The helical bimetallic element 120 responds to, or is actuated by changes in the temperature of the magnetic member 110 to cause the rotatable shaft 130 to turn in one direction or the other depending upon the change in the temperature of the magnetic member 110.

In order to provide a visual indication of the temperature or thermal condition of the magnetic member 110 when the temperature or thermal condition of the magnetic member 110 and the increasing temperature or thermal load condition of the associated electrical apparatus inside the casing 500 exceeds a predetermined value, contact means are coupled or disposed to be responsive to the temperature or thermal condition of the magnetic member 110 as sensed by the helical bimetallic element 120. In general, when the temperature of the magnetic member 110 and the corresponding temperature or thermal load condition of the associated electrical apparatus exceeds a predetermined value, the contact means, which is disposed in the indicating case or housing 20 and which cooperates or is actuated by the helical bimetallic element 120, is arranged to energize or change the energization of an indicating device or means, more specifically, the signalling lamp or light 80 which is also disposed inside the indicating case 20.

In particular, a contact arm 60 having a moving contact 61 mounted or disposed thereon is connected or attached to the rotatable shaft 130, as best shown in FIGS. 1 and 2. The contact arm 60 is preferably formed from an electrically conducting material for reasons which will be explained hereinafter. The contact arm 60, as shown in FIG. 1, is arranged to rotate as the rotatable shaft rotates in response to changes in the temperatures of the magnetic member 110, as sensed by the helical bimetallic element 120, which actuates said rotatable shaft. A stationary contact 62 is disposed in the path of the contact arm 60 as it rotates in a clockwise direction, the stationary contact 62 being preferably formed from a material which has permanent magnetic properties. The stationary contact 62 is secured to a bracket member 52 by suitable means, such as the rivet 64. The bracket member 52 is secured in turn to the indicating case 20 by the rivets 54 which also assist in securing the indicating case 20 to the base member 30, as best shown in FIGS. 2 and 4.

The indicating lamp 80 which is preferably of the neon glow type, is supported by a bracket member 58 which is secured to the indicating case 20 by the rivet 56 and by the supporting member 84 which may be formed integrally with the indicating case 20 as a projecting part on the inside of said indicating case, as best shown in FIGS. 1 and 4. In order to increase the visibility of the indicating lamp 80 when energized and viewed from the ground or any distant location, a reflecting member 86 which may be of the polished metal type, is disposed between the lamp 80 and the supporting member 84, said supporting member having a suitable curved recess in which said reflecting member may be attached or otherwise secured. It should be noted also that the rivet 56 which secures the bracket member 58 to the indicating case 20 and assists in securing said indicating case to the base member 30 is electrically connected to the second terminal 142 by the conductor 182, as best shown in FIG. 4.

In order to complete the electric circuit which energizes the lamp 80, one terminal of the lamp 80 is connected to a current limiting resistor 66 through a conductor 72 and the other terminal of the lamp 80 is connected through a conductor 82 to the bracket member 58 which is preferably formed from electrically conducting material. The other side of the current limiting resistor 66 is connected through the conductor 68 to the bracket member 52 which is also preferably formed from electrically conducting material. The current limiting resistor 66 may be supported inside the indicating case 20 by any suitable means such as the supporting member 74, which in turn is secured to the indicating case 20. In order to clamp the conductors 82 and 68 to the bracket members 58 and 52 respectively and to insure a good electrical connection between said conductors and said bracket members, a generally U-shaped clamping member 65, which is preferably formed from an electrically insulating material, is disposed to hold the conductors 82 and 68 in position. The clamping member 65 is secured in turn by suitable means such as the screw or rivet 76 which engages a projecting supporting member 67 which is preferably formed integrally with the indicating case 20. It is to be noted that the material from which the indicating case 20 is formed must be electrically insulating as well as weatherproof for a purpose which will be discussed hereinafter.

In order to protect the parts of the indicator 10, which are disposed inside the indicating case 20, a suitable window made from a transparent material, such as glass or a suitable plastic material, is secured to the front end of the indicating case 20 by a metallic bezel ring 94 which clamps the window 92 to the flanged portion 96 of the indicating case 20. In order to seal the indicating case 20, a gasket 98 is disposed between the window 92 and the flanged portion 96 of the indicating case 20. In order to seal the joint between the base member 30 and the indicating case 20, which are secured to each other by the rivets 54 and 56, a suitable gasket or O-ring packing member 174 is disposed in a suitable recess in said base member at the point where the indicating case 20 and the base member 30 are in contact with each other.

It is to be noted that the stationary contact 62 which is preferably formed as a permanent magnet operates to latch or hold the moving contact 61 which is disposed on and rotates with the contact arm 60 in the closed position, after the temperature of the magnetic member 110 and the corresponding temperature of the associated electrical apparatus has exceeded a predetermined value. In order to provide means for resetting the contact arm 60 after it has reached the position shown in FIG. 1 and is being held in the position shown in FIG. 1 by the permanent magnet from which the stationary contact 62 is formed, a resetting member 42 is disposed adjacent to the contact arm 60 when it is in the closed position. The resetting member 42 includes a projecting part 43 which passes through and extends below the indicating case 20, as shown in FIG. 1. In order to maintain the resetting member 42 in the position shown in FIG. 1, a biasing spring 78 is disposed between said resetting member and the bracket member 52. The biasing spring 78 may be positioned by the projecting part 48 on the bracket member 52 and the projecting part 46 on the resetting member 42. The resetting member 42 also includes a projecting arm 44 which moves up to lift the contact arm 60 off the stationary contact 62 when the projecting part 43 of the resetting member 42 is pushed upward against the biasing spring 78. When pressure is removed from the projecting part 43 of the resetting member 42, said resetting member is returned to the position shown in FIG. 1 by the biasing spring 78. In order to seal the opening in the indicating case 20 where the resetting member 42 passes through said indicating case, a suitable gasket or O-ring packing member 88 is disposed adjacent to the inside of said indicating case where the resetting member 42 passes through said indicating case.

The over-all operation of the thermal indicator 10 will now be considered. Referring to FIGS. 1, 3 and 9, when current flows in one or more of the conductor leads 530 to and from the electrical apparatus inside the casing 500 to thereby cause said apparatus to heat up, the temperature of the magnetic member 110 will vary with the temperature or thermal load condition of the associated electrical apparatus inside the casing 500. The helical bimetallic element 120 is then actuated by the change in the temperature of the magnetic member 110 to thereby cause the rotatable shaft 130 which in turn causes a corresponding rotation of the contact arm 60, as shown in FIG. 1. As the temperature of the magnetic member 110 and the corresponding temperature of the associated electrical apparatus increases, the contact arm 60 will rotate in a clockwise direction until the moving contact 61 disposed thereon comes into contact with or into a closed position with the stationary contact 62. Assuming that the terminals 132 and 142 are connected to a source of electrical power or current, the lamp 80 will be energized when the contacts 61 and 62 are in a closed position, as shown in FIG. 1. The electrical circuit which energizes the lamp 80 may be traced starting from terminal 132, then through the rivet 134 and the internal conductor strap 136 to the magnetic member 110, then to the tube member 124, through the leaf spring contact 121 to the helical bimetallic element 120, then through the rotatable shaft 130 to the contact arm 60, through the moving contact 61 to the stationary contact 62, then through the bracket member 52, through the conductor 68, the current limiting resistor 66 and the conductor 72 to one terminal of the lamp 80. The other terminal of the lamp 80 is connected to the terminal 142 through the conductor 82, the bracket member 58, the rivet 56 and the conductor 132, as best shown in FIG. 4. The energization of the lamp 80, after the thermal load of the associated electrical apparatus has exceeded a predetermined value, is maintained by the stationary contact 62 which functions as a latching or holding means to keep the contacts 61 and 62 in the closed position, as shown in FIG. 1 and as previously discussed.

It is to be understood that the terminals 132 and 142 of the thermal indicator 10 may be conveniently connected to the associated electrical apparatus to provide a source of electrical current or power to energize the lamp 80. For example, if the associated electrical apparatus inside the casing or tank 500, shown in FIG. 9, is a transformer, the terminal 132 could be conveniently connected to a ground terminal on the casing 500 and the terminal 142 could be conveniently connected to the terminal connector 522 on the low voltage or secondary bushing 520, as shown in FIG. 9. Since certain types of electrical apparatus are subject to surge voltages, the gap protector or arc shield 160, shown in FIGS. 1 and 2, would operate to limit the voltage applied to the thermal indicator 10 to a safe value in order to prevent damage to said indicator. In other words, the electrodes 154 and 148 of the gap protector 160 are arranged to break down at substantially a predetermined value and limit the voltage applied to the thermal indicator 10 whenever a predetermined surge voltage is present between the terminals 132 and 142.

Figure 5:
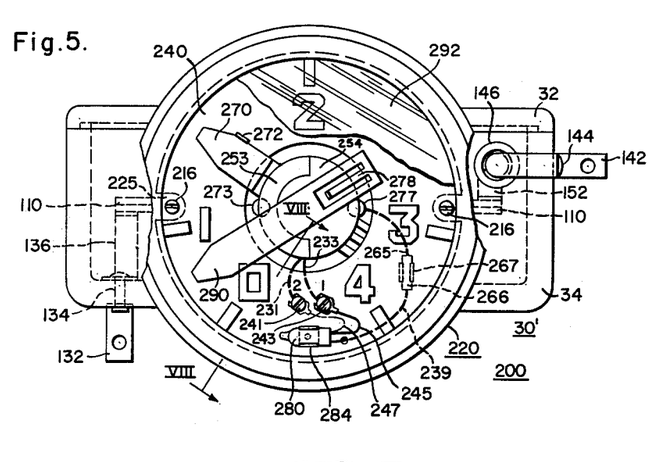
FIG. 5 is a front view in elevation of a thermal indicator illustrating a second embodiment of the invention.
Figure 6:
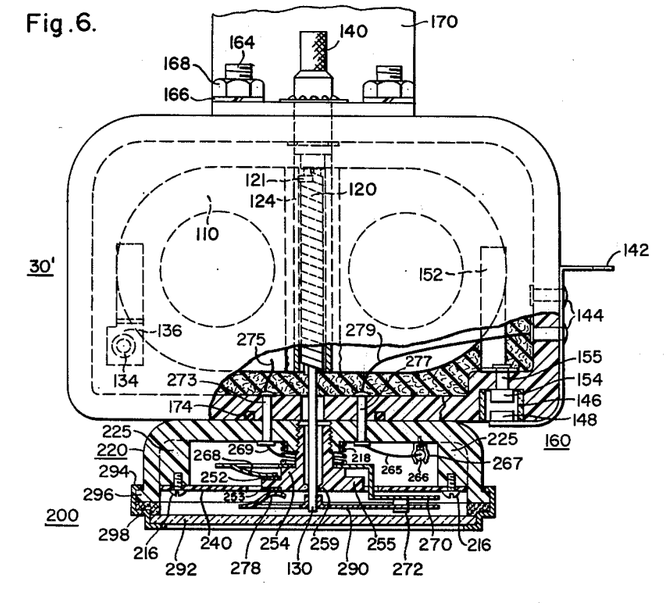
FIG. 6 is a top plan view, partially in section, of the indicator shown in FIG. 5.

Referring now to FIGS. 5 through 7, there is illustrated a thermal load indicator 200 which is similar to the thermal indicator 10, except that the thermal indicator 200 also includes means for indicating the thermal load condition of the associated electrical apparatus at any given time, as well as indicating when said apparatus is being or has been subjected to a thermal load in excess of a predetermined value. In addition, the thermal indicator 200, as illustrated, includes means for indicating the maximum thermal load of the associated electrical apparatus between successive readings of said indicator.

In particular, the thermal indicator 200 comprises a base member 30' which is identical to the base member 30 of the thermal indicator 10, except with respect to several minor details which will be discussed hereinafter, and an indicating case 220 which is similar to the indicating case 20 of the thermal indicator 10, except for the type of indicating means which is disposed inside the indicating case 220. The parts of the base member 30' which are identical to the equivalent parts of the base member 30 bear the same reference numerals.

The indicating case 220 is secured to the base member 30' by the rivets 273 and 277 and is preferably formed from the same type of material as previously described for the indicating case 20 of the thermal indicator 10. For reasons which will be discussed hereinafter, the rivet 273 is electrically connected to the magnetic member 110 by the conductor 275 and the rivet 277 is electrically connected to the second terminal 142 through one of the rivets 144 and the conductor 279. The base member 30', except as just noted, is otherwise identical to the base member 30 previously described for the thermal indicator 10. Similarly to the indicating case 20, the indicating case 220 includes a window 292 which is secured to the flanged portion 296 of the indicating case 220 by the bezel ring 294 and is sealed by the gasket 298.

In order to provide a visual indication of the temperature of the magnetic member 110, an indicating hand pointer 290 is attached to the rotatable shaft 130 and disposed in front of a dial member 240, shown in FIGS. 5 and 6. The dial member 240 is disposed inside the indicating case 220 and may be supported by any suitable means such as the supporting members 225 which may be formed integrally with the indicating case 220 and the screws 216 which pass through the dial member 240 and engage the supporting members 225.

Since the temperature of the magnetic member 110 varies with the temperature or thermal load condition of the associated electrical apparatus inside the casing 500, the dial member 240 may be calibrated in terms of the thermal load of the associated apparatus, which may include windings or coils. In particular, the dial member 240 may be calibrated to indicate the percentage of the rated thermal load of the associated electrical apparatus. The deflection or location of the indicating hand pointer 290 provides a visual indication of the thermal load condition or temperature of the associated electrical apparatus. In order to indicate the maximum thermal load of the associated electrical apparatus between successive readings, a maximum indicating hand pointer is movably disposed about the axis of the rotatable shaft 130 in any suitable manner. As illustrated, a supporting member 254 may be attached to the indicating case 220 at the point where the shaft 130 passes through said indicating case and the maximum indicating hand pointer 270 rotatably mounted or disposed on the supporting member 254. The supporting member 254 may also assist in supporting the shaft 130 as said shaft passes into the indicating case 220 as indicated at 259. Since the maximum indicating hand pointer 270 is disposed between the indicating hand pointer 290 and the dial member 240, the maximum hand pointer 270 may be provided with a projection or cam member 272 which is arranged to be driven or rotated by the indicating hand pointer 290 to the highest or maximum point of travel or deflection of the hand pointer 290 during the operation of the indicator 200. Suitable means may also be provided for retaining the maximum indicating hand pointer in the highest point or position to which it is driven by the hand pointer, such as the spring 218 which still permits the maximum indicating hand pointer 270 to be driven or rotated by the hand pointer 290. Since the indicating hand pointer 290 is arranged to drive the maximum indicating hand pointer 270 only in the upward or clockwise direction, the maximum indicating hand pointer 270 remains at the maximum point of travel or deflection of the indicating hand pointer 290 whenever the bimetallic element 120 cools and causes the indicating hand pointer 290 to rotate in a counterclockwise direction to a lower thermal load reading.

In order to provide a visual indication when the thermal load of the associated electrical apparatus is presently exceeding or has exceeded a predetermined value, contact means are provided in the indicating case 220 for energizing or changing the energization of an indicating device or means, more specifically an indicating light or lamp 280 which is preferably of the neon glow type. By suitable selection of the connections of the indicator 200, the indicating lamp 280 may be energized whenever the thermal load of the associated electrical apparatus is presently in excess of a predetermined value by the operation of contacts associated with the indicating hand pointer 290. Alternatively, the indicating lamp 280 may be energized and maintained in an energized condition to indicate that the thermal load of associated electrical apparatus has exceeded a predetermined value between successive readings or during a particular period since the resetting of the maximum hand pointer 270 while the associated electrical apparatus has been in operation.

In particular, a moving contact 278 is disposed or mounted on the indicating hand pointer 290 and rotates with said indicating hand pointer. A stationary contact 253, which is generally C-shaped as shown in FIG. 5, is mounted on the flanged portion 255 of the supporting member 254. The moving contact 278 on the indicating hand pointer 290 is arranged to slidably engage the stationary contact 253 when the thermal load of the associated electrical apparatus exceeds a predetermined value such as the thermal load indicated by the numeral 2 on the dial member 240 which may correspond to or indicate 200% of the rated thermal load of the associated electrical apparatus.

When the moving contact 278, which may be formed integrally from the indicating hand pointer 290 and which may be of the spring type or brush type contact, engages the stationary contact 253, the lamp 280 is energized from the source of electric current which is connected between the terminals 132 and 142 of the base member 30'. The electrical circuit which energizes the lamp 280 may be traced from the terminal 132, through the rivet 134, the conductor strap 136, the magnetic member 110, the tube member 124, the leaf spring contact 121, the bimetallic element 120, the shaft 130, the indicating hand pointer 290, the moving contact 278, the stationary contact 253, through the conductor 233 to the terminal 243 and through the conductor 245 to one terminal of the lamp 280. The other terminal of the lamp 280 is connected to the terminal 142 through the conductor 239, the current limiting resistor 266, the conductor 265, the rivet 277, the conductor 279 and through the rivet 144 to the terminal 142. The indicating lamp 280 and the current limiting resistor 266 may be suitably supported inside the indicating casing 220 by the supporting members 284 and 267, respectively, which are in turn secured to said indicating case. It is important to note that the electrical circuit just described for energizing the lamp 280 is completed by the moving contact 278 on the indicating hand pointer 290 only when the indicating hand pointer indicates a thermal load in excess of a predetermined value. When the indicating hand pointer 290 rotates to a lower thermal load position below said predetermined value, the above circuit is interrupted since the moving contact 278 no longer engages the stationary contact 253 and the above circuit is interrupted to deenergize the indicating lamp 280. In other words, when the conductor 245 connects one terminal of the lamp 280 to the terminal 243 the indicating lamp is operated in essentially an "on-off" manner.

Alternatively, the indicator 200 may be connected to have the indicating lamp 280 controlled by the operation of the maximum hand pointer 270. This may be accomplished by connecting one terminal of the indicating lamp 280 by the conductor 247 to the terminal 241, which in turn is connected to the stationary contact 252. The stationary contact 252 is similar to the stationary contact 253 and is mounted on the back of the flanged portion 255 of the supporting member 254, as shown in FIGS. 6 and 7. A moving contact 268 is disposed or mounted on the maximum hand pointer 270 and rotates with said maximum hand pointer. The moving contact 268 may also be formed integrally with the maximum hand pointer 270 and may be of the spring type or brush type to slidably engage the stationary contact 252 whenever the position of the maximum hand pointer 270 is above a predetermined thermal load reading on the dial member 240. The position at which the moving contact 268 slidably engages the stationary contact 252 may be the same or at a different position as for the indicating hand pointer 290. Whenever the indicating hand pointer 290 drives the maximum hand pointer 270 above a predetermined position or when the corresponding thermal load of the associated electrical apparatus exceeds a predetermined value, the contacts associated with the maximum hand pointer 270 slidably engage to close an electrical circuit which energizes the indicating lamp from the source of electrical current connected between the terminals 132 and 142. The electrical circuit which energizes the indicating lamp 280 in the latter case may be traced from the terminal 132, through the rivet 134, the conductor strap 136, the magnetic member 110, the conductor 275, the rivet 273, the conductor 269 which electrically connects the rivet 273 and the spring 218, the spring 218, the maximum indicating hand pointer 270, the moving contact 268, the stationary contact 252, the conductor 231, the terminal 241 and the conductor 247 to one terminal of the lamp 280. The other terminal of the lamp 280 is completed through the electrical circuit, previously described, to the terminal 142 to thereby energize the lamp 280. The contacts 268 and 252 which are closed by the movement or rotation of the maximum indicating hand pointer 270, therefore, energize the indicating lamp 280 when the thermal load of the associated electrical apparatus exceeds a predetermined value and said maximum hand pointer is driven by the indicating hand pointer 290 to a position which closes said contacts. Since the contacts 268 and 252 associated with the indicating hand pointer then remain closed independently of the position of the indicating hand pointer when the associated electrical apparatus cools down and the indicating hand pointer 290 rotates in a counterclockwise direction, said contacts provide a holding circuit for maintaining the energization of the indication lamp 280, similarly to the stationary contact 62 of the thermal indicator 10 which was preferably formed as a permanent magnet. It is thereby noted that for proper operation of the electrical circuits just described for energizing the lamp 280, the supporting member 254 on which the stationary contacts 252 and 253 are mounted and the dial member 240 must be formed from an electrically insulating material.

In summary, the mode of operation of the indicator 200 with respect to the energization of the lamp 280 is determined by connecting one terminal of the lamp 280 to either the terminal 241 or to the terminal 243 by either the conductor 247 or the conductor 245, respectively. The selection of the latter connection determines whether the energization of the indicating lamp 280 is controlled by the contacts associated with the indicating hand pointer 290 or by the contacts associated with the maximum hand pointer 270, as just discussed. When the energization of the lamp 280 is controlled by the movement of the indicating hand pointer 290, said indicating lamp is only energized when the indicating hand pointer 290 is at a position which indicates that the thermal load of the associated electrical apparatus is presently in excess of a predetermined value. When the associated apparatus cools and the thermal load decreases below said predetermined value, the indicating lamp 280 is then deenergized by the counterclockwise rotation of the indicating hand pointer 290. On the other hand, if the energization of the indicating lamp 280 is controlled by the rotation of the maximum hand pointer 270 which is driven by the hand pointer 290, the indicating lamp 280 is energized when the maximum hand pointer 270 is driven by the hand pointer 290 to a position which indicates that the thermal load of the associated electrical apparatus has exceeded a predetermined value and the lamp then remains energized independently of the position of the indicating hand pointer 290 until the maximum hand pointer 290 is reset by suitable means (not shown), such as an external magnetic device. It is to be understood that the alternative connections of the indicating lamp 280 to the contacts associated with either the indicating hand pointer 290 or the maximum hand pointer 270 may be accomplished by a suitable selector switch rather than by the changes in the connections of one of the terminals of said lamp to one of the terminals 241 or 243. It is to be noted that the contacts associated with the hand pointers 290 and 270 are each equivalent to a rotary switch whose position is controlled by the movement of said hand pointers, and it is to be understood that conventional rotary switches could be substituted for the contact means associated with either of the indicator hands 270 and 290. It is to be noted that the mounting of the indicator 200 on the associated electrical apparatus could be provided similarly to that of the indicator 10, as shown in FIG. 9, with the indicator 200 substituted for the indicator 10.

Considering the over-all operation of the thermal load or temperature indicator 200, the temperature or thermal load condition of the associated electrical apparatus inside the casing 500 changes whenever the electrical current flowing through the conductor leads 530 changes. The changes in the electrical current through the conductor leads 530 also causes a corresponding change in the temperature of the magnetic member 110 which is a function of and varies with the temperature of the associated electrical apparatus inside the casing 500. A change in the temperature or thermal condition of the magnetic member 110 causes the helical bimetallic element 120 to be actuated in response to said changes in temperature which in turn causes a turning movement of the rotating shaft 130. The rotation of the shaft 130 causes a change in the deflection of the indicating hand pointer 290 which causes a change in the thermal load reading on the calibrated dial member 240 of the indicator 200. The maximum travel or deflection of the indicating hand pointer 290 between successive readings is indicated visually by the position of the maximum indicating hand pointer 270, as previously discussed. It is to be understood that the dial member 240 may also be calibrated in terms of various other conductors associated with an electrical apparatus which varies with the electrical current flowing to and from said apparatus. Finally, as previously discussed, the indicating lamp 280 provides an indication of whether the thermal load of an associated electrical apparatus is presently exceeding a predetermined value or alternatively has exceeded said predetermined value since the maximum hand pointer 290 was previously reset to a position which corresponds to a value below said predetermined value. It is to be understood that in a particular application, only one of the latter modes of operation may be provided in a thermal indicator similar to the thermal indicator 200.

It is to be understood that the magnetic member 110 may be provided in different sizes and shapes in different applications, but it is essential that the magnetic member 110 be disposed in the magnetic field of the leads in which electrical current flows to and from associated electrical apparatus whose thermal condition depends on the amount of electrical current flow in said apparatus. Referring to FIG. 8, there is illustrated an alternative form of the magnetic member 110 which is particularly adapted for installation around the leads of an associated electrical apparatus without disturbing said leads since said leads are not required to pass through holes in the magnetic member 410, shown in FIG. 8. In particular, the magnetic member 410 is similar to the magnetic member 110 since it is formed from two plates 414 each having a curved portion near the middle of the said plates to form a cavity 425 in which a thermally responsive device such as a helical bimetallic element may be disposed. Each of the plates 414 which comprises the magnetic member 410 includes a generally U-shaped recess, as indicated at 422, which permits the mounting of the magnetic member 410 around the leads of an associated electrical apparatus such as the leads 530, shown in FIG. 9, without disturbing said leads. It is to be understood that in an indicator which includes the magnetic member 410 rather than the magnetic member 110 that the base member surrounding the magnetic member 410 would have to be suitably modified to also include recesses which would correspond to the recesses 422 included in the magnetic member 410.

Although it is preferred to have the magnetic member, such as the magnetic member 110, included in an indicator of the type disclosed, substantially surrounded by thermally insulating materials as described for the indicators 10 and 200, it may be desirable in certain applications to provide thermally conductive material adjacent to a portion of said magnetic member to function as a heat sink in order to have the magnetic member more closely simulate the thermal operating characteristics or qualities of an associated electrical apparatus. It is also desirable that the magnetic member 110 and the thermally insulating material employed to control the heat transfer from said member be designed so that the thermal time constant of said member more closely approaches the thermal time constant of the associated electrical apparatus.

It is also to be understood that other types of signalling devices, such as audible alarms may be substituted for the signal lamps 80 and 280 in the indicators 10 and 200, respectively.

The apparatus embodying the teachings of this invention has several advantages. For example, the thermal load indicator or temperature indicator, as disclosed, may be readily mounted or installed on existing electrical apparatus of the enclosed type without the necessity for opening the casing of said apparatus. In addition, the thermal image of an electrical apparatus made availble outside the casing of said apparatus is effectively employed in a thermal indicator which either may indicate whether the associated apparatus is presently exceeding or has exceeded a predetermined value of thermal load and may also indicate the present thermal load of the associated apparatus in terms of a percentage of the rated thermal load of said apparatus.

Since numerous changes may be made in the above described apparatus and different embodiments of the invention may be made without departing from the spirit and scope thereof, it is intended that all the matter contained in the foregoing description or shown in the accompanying drawing, shall be interpreted as illustrative and not in a limiting sense.

I claim as my invention:

1. A thermal load indicator for electrical apparatus including an electrical winding inside a casing which is subject to heating when conducting electrical current and leads connected to said winding for conducting current to and from said winding, the current flow through said leads setting up a magnetic field around said leads, comprising a magnetic member disposed in said field outside said casing which causes said member to heat up when current flows in said leads, said magnetic member including one or more conductor passages through which said leads may pass, a bimetallic element disposed adjacent to said member for deforming in response to the temperature of said member, a base member for enclosing said magnetic member, said base member being formed from a thermally insulating material and including a cover member having one or more openings and having extending portions around each of said openings which pass through the conductor passages of said magnetic member, and indicating means associated with said bimetallic element for indicating when the thermal load of said apparatus exceeds a predetermined value as said bimetal deforms.

2. A thermal load indicator for a transformer having an electrical coil disposed in a casing which heats up when carrying electric current and leads connected to said coil for supplying electric current thereto, the current flow through said leads setting up a magnetic field around said leads, comprising a magnetic member disposed outside said casing in said field to heat up when current flows in said leads, said magnetic member comprising two plates each having first and second apertures assembled in substantial registry to form a receptacle therebetween, the temperature of said member varying with that of said coil, a helical bimetallic element disposed in the receptacle of said member for deforming in response to the temperature of said member, contact means coupled to said bimetallic element to be actuated when the thermal load of said transformer exceeds a predetermined value, a base member for enclosing said magnetic member, said base member being formed from a thermally insulating material and including a cover member having one or more openings and having extending portions around each of said openings which pass through the apertures of said magnetic member, and indicating means responsive to the actuation of said contact means for indicating when the thermal load of said transformer exceeds said predetermined value.

3. A thermal load indicator for a transformer having an electrical coil in a casing which heats up when carrying electric current and leads connected to said coil for supplying electric current thereto, the current flow through said leads setting up a magnetic field around said leads, comprising a magnetic member disposed outside said casing in said field to heat up when current flows in said leads, said magnetic member comprising two assembled plates shaped to provide a receptacle therebetween and provided with one or more openings through which one or more leads may pass, the temperature of said member varying with that of said coil, a helical bimetallic element disposed in the receptacle of said member for deforming in response to the temperature of said member, a rotatable shaft connected to said bimetallic element contact means coupled through said shaft to said bimetallic element to be actuated when the thermal load of said transformer exceeds a predetermined value, and a signal light responsive to the actuation of said contact means through a circuit which includes said magnetic member, said bimetallic element and said shaft connected in series circuit relation for indicating when the thermal load of said transformer exceeds said predetermined value.

4. A thermal load indicator for a transformer having an electrical winding in a casing which heats up when carrying electric current and leads connected to said winding for carrying current to and from said winding, the flow of current causing a magnetic field around said leads, comprising a magnetic member disposed outside said casing in the field of at least one of said leads, the temperature of said member varying with that of said winding, a bimetallic element disposed adjacent to said member for deforming in response to the temperature of said member, a rotatable shaft connected to said bimetallic element, a contact arm having a moving contact disposed thereon, said arm being disposed on said shaft, a stationary contact disposed in the path of said contact arm, said contacts being arranged to close when the thermal load of said transformer exceeds a predetermined value, and signalling means connected in series circuit relation with said bimetallic element, said shaft, said contacts and said magnetic member to be energized therethrough when said thermal load exceeds said predetermined value.

5. A thermal load indicator for a transformer having an electrical winding in a casing which heats up when carrying electric current and leads connected to said winding for carrying current to and from said winding, the flow of current causing a magnetic field around said leads, comprising a magnetic member disposed outside said casing in the field of at least one of said leads, the temperature of said member varying with that of said winding, a bimetallic element disposed adjacent to said member for deforming in response to the temperature of said member, a rotatable shaft connected to said bimetallic element, a contact arm having a moving contact disposed thereon, said arm being disposed on said shaft, a stationary contact disposed in the path of said contact arm, said contacts being arranged to close when the thermal load of said transformer exceeds a predetermined value, signalling means connected in circuit relation with said contacts to be energized when said thermal load exceeds said predetermined value, the energizing circuit of said signalling means including said magnetic member, said bimetallic element and said shaft connected in series circuit relation and holding means for maintaining said contacts in the closed position after said thermal load exceeds said predetermined value independently of the position of said contact arm.

6. A thermal load indicator for mounting outside the casing of a transformer having an electrical winding which heats up when carrying electric current and leads connected to said winding for carrying current to and from said winding, the flow of current causing a magnetic field around said leads, comprising a magnetic member disposed outside said casing in the field of at least one of said leads, said magnetic member comprising two assembled plates having one or more apertures through which one or more leads may pass, the temperature of said member varying with that of said winding, a helical bimetallic element disposed adjacent to said member for deforming in response to the temperature of said member, a casing of thermally insulating material for enclosing said member and said bimetallic element to control the heat transfer from said member, the latter casing including a cover member having one or more openings and extending portions around said openings which pass through each of said apertures of said magnetic member, a rotatable shaft connected to said bimetal, a contact arm having a moving contact disposed thereon, said arm being disposed on said shaft, a stationary contact disposed in the path of said contact arm, said contacts being arranged to close when the thermal load of said transformer exceeds a predetermined value, and signalling means connected in circuit relation with said contacts to be energized when said thermal load exceeds said predetermined value independently of the position of said contact arm.

7. A thermal load indicator for a transformer having an electrical winding in a casing which heats up when carrying electric current and leads connected to said winding for carrying current to and from said winding, the flow of current causing a magnetic field around said leads, comprising a magnetic member disposed outside said casing in the field of at least one of said leads, said magnetic member comprising two plates assembled to provide a receptacle therebetween, the temperature of said member varying with that of said winding, a helical bimetallic element disposed in the receptacle of said member for deforming in response to the temperature of said member, a rotatable shaft connected to said bimetallic element, a contact arm having a moving contact disposed thereon, said contact arm being disposed on said shaft, a stationary contact disposed in the path of said contact arm, said contacts being arranged to close when the thermal load of said transformer exceeds a predetermined value, signalling means connected in circuit relation with said contacts to be energized when said thermal load exceeds said predetermined value, the energizing circuit of said signalling means including said magnetic member, said bimetallic element and said shaft connected in series circuit relation and holding means for maintaining said contacts in closed relation and for maintaining the energization of said signalling means after said thermal load exceeds said predetermined value independently of the position of said contact arm.

8. A thermal load indicator for mounting outside the casing of a transformer having an electrical winding which heats up when carrying electric current and leads connected to said winding for carrying current to and from said winding, the flow of current causing a magnetic field around said leads, comprising a magnetic member disposed outside said casing in the field of at least one of said leads, the temperature of said member varying with that of said winding, a helical bimetallic element disposed adjacent to said member for deforming in response to the temperature of said member, a rotatable shaft connected to said bimetallic element, a contact arm having a moving contact disposed thereon, said arm being disposed on said shaft, a stationary contact disposed in the path of said contact arm, said contacts being arranged to close when the thermal load of said transformer exceeds a predetermined value, signalling means connected in circuit relation with said contacts to be energized when said thermal load exceeds said predetermined value, the energizing circuit of said signalling means including said magnetic member, said bimetallic element and said shaft connected in series circuit relation and holding means for maintaining said contacts in closed relation and for maintaining the energization of said signalling means after said thermal load exceeds said predetermined value, independently of the subsequent thermal load of said transformer, said holding means comprising a permanent magnet disposed adjacent to said stationary contact.

9. A thermal load indicator for a transformer having an electrical winding in a casing subject to heating when carrying electric current and leads for carrying current to and from said winding, the flow of current through said leads creating a magnetic field around said leads, comprising a magnetic member disposed outside said casing in the field of said leads to heat up when current flows in at least one of said leads, the temperature of said member varying with that of said winding, a helical bimetallic element disposed adjacent to said member to deform in response to the temperature of said member, a rotatable shaft connected to said bimetallic element indicating means actuated by said bimetallic element through said shaft for indicating the thermal load of said transformer, and a signalling means energized by said indicating means through a circuit which includes said magnetic member, said bimetallic element and said shaft electrically connected in series circuit relation when the thermal load of said transformer exceeds a predetermined value.

10. A thermal load indicator for mounting outside the casing of a transformer having an electrical winding subject to heating when carrying electric current and leads for carrying current to and from said winding, the flow of current through said leads creating a magnetic field around said leads, comprising a magnetic member disposed outside said casing in the field of said leads to heat up when current flows in at least one of said leads, said magnetic members including one or more conductor passages through which said leads pass the temperature of said member varying with that of said winding, a helical bimetallic element disposed adjacent to said member to deform in response to the temperature of said member, indicating means for indicating the temperature of said member, said indicating means comprising a rotatable shaft connected to said bimetallic element, an indicating hand pointer attached to said shaft, and a dial member disposed back of said hand pointer, a base member for enclosing said magnetic member, said base member being formed from a thermally insulating material and including a cover member having one or more openings and having extending portions around each of said openings which pass through the conductor passages of said magnetic member, and signalling means actuated by said indicating means when the thermal load of said transformer exceeds a predetermined value.

11. A thermal load indicator for a transformer having an electrical winding in a casing subject to heating when carrying electric current and leads for carrying current to and from said winding, the flow of current through said leads creating a magnetic field around said leads, comprising a magnetic member disposed outside said casing in the field of said leads to heat up when current flows in at least one of said leads, the temperature of said member varying with that of said winding, a helical bimetallic element disposed adjacent to said member to deform in response to the temperature of said member, indicating means for indicating the temperature of said member, said indicating means comprising a rotatable shaft connected to said bimettallic element, an indicating hand pointer attached to said shaft, and a dial member disposed back of said hand pointer, and signalling means actuated by said indicating means when the thermal load of said transformer exceeds a predetermined value, said signalling means comprising a moving contact disposed on said indicating hand pointer and a stationary contact disposed adjacent to said indicating hand to be slidably engaged by said moving contact when the thermal load of said transformer exceeds a predetermined value, and a signal light connected in series circuit relation with said bimetallic element, said shaft, said contacts and said magnetic member to be energized when said thermal load exceeds said predetermined value.

12. A thermal load indicator for mounting outside the casing of a transformer having an electrical winding subject to heating when carrying electric current and leads for carrying current to and from said winding, the flow of current through said leads creating a magnetic field around said leads, comprising a magnetic member disposed outside said casing in the field of said leads to heat up when current flows in at least one of said leads, said magnetic member having two plates each having first and second conductor passages through which said leads may pass, said plates being shaped and assembled in substantial registry to form a receptacle therebetween, the temperature of said member varying with that of said winding, a helical bimetallic element disposed in the receptacle of said member to deform in response to the temperature of said member, indicating means for indicating the temperature of said member, said indicating means comprising a rotatable shaft connected to said bimetallic element, an indicating hand pointer attached to said shaft, and a dial member disposed back of said hand pointer, and a follower hand pointer disposed about said shaft to be driven by said indicating hand pointer to indicate the maximum indication of said indicating hand pointer, a base member for enclosing said magnetic member, said base member being formed from a thermally insulating material and including a cover member having one or more openings and having extending portions around each of said openings which pass through the conductor passages of said magnetic member, and signalling means actuated by said indicating means when the thermal load of said transformer exceeds a predetermined value.

13. A thermal load indicator for a transformer having an electrical winding in a casing subject to heating when carrying electric current and leads for carrying current to and from said winding, the flow of current through said leads creating a magnetic field around said leads, comprising a magnetic member disposed outside said casing in the field of said leads to heat up when current flows in at least one of said leads, the temperature of said member varying with that of said winding, a helical bimetallic element disposed adjacent to said member to deform in response to the temperature of said member, indicating means for indicating the temperature of said member, said indicating means comprising a rotatable shaft connected to said bimetallic element, an indicating hand pointer attached to said shaft, and a dial member disposed back of said hand pointer, and a follower hand pointer disposed about said shaft to be driven by said indicating hand pointer to indicate the maximum indication of said indicating hand pointer, and signalling means actuated by said indicating means when the thermal load of said transformer exceeds a predetermined value, said signalling means comprising a rotary switch having a moving contact disposed on said follower hand pointer and a stationary contact disposed adjacent to said follower hand pointer to be slidably engaged by said moving contact when the thermal load of said transformer exceeds a predetermined value, and a signalling lamp connected in series circuit relation with said follower hand pointer, said magnetic members and said contacts to be energized when said contacts are engaged by the movement of said follower hand pointer, said lamp being then energized independently of the position of said indicating hand pointer.

14. A thermal load indicator for mounting outside the casing of a transformer having an electrical winding subject to heating when carrying electric current and leads for carrying current to and from said winding, the flow of current through said leads creating a magnetic field around said leads, comprising a magnetic member disposed outside said casing in the field of said leads to heat up when current flows in at least one of said leads, the temperature of said member varying with that of said winding, a helical bimetallic element disposed adjacent to said member to deform in response to the temperature of said member, indicating means for indicating the temperature of said member, said indicating means comprising a rotatable shaft connected to said bimetallic element, an indicating hand pointer attached to said shaft, and a dial member disposed back of said hand pointer, and a follower hand pointer disposed about said shaft to be driven by said indicating hand pointer to indicate the maximum indication of said indicating hand pointer, and signalling means actuated by said indicating means when the thermal load of said transformer exceeds a predetermined value, said signalling means comprising contact means actuated by said follower hand pointer when said thermal load exceeds said predetermined value and a signal lamp connected in series circuit relation with said magnetic member, said follower hand pointer and said contact means to be energized independently of the position of said indicating hand pointer after said contact means are actuated.

15. A thermal load indicator for a transformer having an electrical winding in a casing subject to heating when carrying electric current and leads for carrying current to and from said winding, the flow of current through said leads creating a magnetic field around said leads, comprising a magnetic member disposed outside said casing in the field of said leads to heat up when current flows in at least one of said leads, said magnetic member comprising two assembled plates having one or more openings through which one or more leads may pass, the temperature of said member varying with that of said winding, a helical bimetallic element disposed adjacent to said member to deform in response to the temperature of said member, a casing of thermally insulating material for enclosing said member and said bimetal to control the heat transfer from said member and match the thermal characteristics of said member with those of said transformer, said latter casing including a cover member having one or more apertures and extending portions around each of said apertures which pass through said openings indicating means for indicating the temperature of said member, said indicating means comprising a rotatable shaft connected to said bimetallic element, an indicating hand pointer attached to said shaft, and a dial member disposed back of said hand pointer, and a follower hand pointer disposed about said shaft to be driven by said indicating hand pointer to indicate the maximum indication of said indicating hand pointer, and signalling means actuated by said indicating means when the thermal load of said transformer exceeds a predetermined value, said signalling means comprising contact means actuated by said follower hand pointer when said thermal load exceeds said predetermined value and a signal lamp connected in series circuit relation with said follower hand pointer, said magnetic member and said contact means to be controlled independently of the position of said indicating hand pointer after said contact means are actuated.

16. A thermal load indicator for a transformer having an electrical winding subject to heating when carrying electric current and leads for carrying current to and from said winding, the flow of current through said leads creating a magnetic field around said leads, comprising a magnetic member disposed in the field of said leads to heat up when current flows in at least one of said leads, said magnetic member comprising two plates shaped and assembled to form a receptacle therebetween, the temperature of said member varying with that of said winding, a helical bimetallic element disposed in the receptacle of said member to deform in response to the temperature of said member, indicating means for indicating the temperature of said member, said indicating means comprising a rotatable shaft connected to said bimetallic element, an indicating hand pointer attached to said shaft, and a dial member disposed back of said hand pointer, and signalling means actuated by said indicating means when the thermal load of said transformer exceeds a predetermined value, said signalling means comprising a rotary switch actuated by the movement of said indicating hand, said switch hand having a moving contact disposed on said indicating hand pointer and a stationary contact disposed adjacent to said indicating hand to be slidably engaged by said moving contact when the thermal load of said transformer exceeds a predetermined value, and a signal light connected in series circuit relation with said contacts to be energized through said magnetic member, said bimetallic element and said shaft when said thermal load exceeds said predetermined value.

17. A thermal load indicator for mounting outside the casing of a transformer having an electrical winding subject to heating when carrying electric current and leads for carrying current to and from said winding, the flow of current through said leads creating a magnetic field around said leads, comprising a magnetic member disposed outside said casing in the field of said leads to heat up when current flows in at least one of said leads, said magnetic member comprising two assembled plates having one or more openings through which one or more leads may pass, the temperature of said member varying with that of said winding, a helical bimetallic element disposed adjacent to said member to deform in response to the temperature of said member, a rotatable shaft connected to said bimetallic element thermal insulation disposed around said member and said bimetallic element to control the heat transfer from said member so that the thermal time constant of said member approaches that of said transformer, indicating means actuated by said bimetallic element through said shaft for indicating the thermal load of said transformer, and a signalling means energized by said indicating means through a series circuit which includes said bimetallic element, said magnetic member and said shaft when the thermal load of said transformer exceeds a predetermined value.

References Cited in the file of this patent

UNITED STATES PATENTS

| | | |
|---|---|---|
| 747,297 | Bristol | Dec. 15, 1903 |
| 1,020,045 | Merryman | Mar. 12, 1912 |
| 1,463,189 | Baker | July 31, 1923 |
| 1,470,079 | Hoeschen | Oct. 9, 1923 |
| 1,485,013 | Blakeslee | Feb. 26, 1924 |
| 1,917,163 | Stephens et al. | July 4, 1933 |
| 1,953,914 | Camilli | Apr. 3, 1934 |
| 2,456,062 | Iwanski | Dec. 14, 1948 |
| 2,468,693 | Stoecklin et al. | Apr. 26, 1949 |
| 2,502,159 | Lamb et al. | Mar. 28, 1950 |
| 2,680,214 | Ford | June 1, 1954 |
| 2,722,679 | Barr | Nov. 1, 1955 |

FOREIGN PATENTS

| | | |
|---|---|---|
| 487,735 | Great Britain | June 24, 1938 |
| 571,125 | Great Britain | Aug. 8, 1945 |